United States Patent [19]

Thomas, Jr. et al.

[11] 3,885,922

[45] May 27, 1975

[54] PRESSURE VESSEL AND BIMETALLIC COMPONENTS

[75] Inventors: Royal David Thomas, Jr., Narberth; James E. Norcross, Media, both of Pa.

[73] Assignee: Arcos Corporation, Philadelphia, Pa.

[22] Filed: Apr. 25, 1974

[21] Appl. No.: 464,065

Related U.S. Application Data

[60] Continuation-in-part of Ser. No. 237,021, May 22, 1972, abandoned, which is a division of Ser. No. 74,974, Sept. 24, 1970, Pat. No. 3,696,228.

[52] U.S. Cl. .................................. 29/191; 29/196.1
[51] Int. Cl. ............................................. B32b 15/00
[58] Field of Search ............. 29/191, 196.1; 220/62, 220/83; 164/52; 219/73, 76, 137

[56] References Cited
UNITED STATES PATENTS

| | | | |
|---|---|---|---|
| 1,005,142 | 10/1911 | Becker | 29/196.1 |
| 1,896,411 | 2/1933 | Maskrey | 29/196.1 |
| 3,139,511 | 6/1964 | Kudelko | 219/76 |
| 3,511,303 | 5/1970 | Parsons | 164/50 |

Primary Examiner—L. Dewayne Rutledge
Assistant Examiner—O. F. Crutchfield
Attorney, Agent, or Firm—Jackson, Jackson and Chovanes

[57] ABSTRACT

A pressure vessel with corrosion resistant lining and inexpensive overall is constructed in two steps. First, a thin-walled vessel is prepared from integrally clad plate by conventional means, the cladding thus being of controlled quality, thickness and well bonded to the backing metal. Then the thickness of the backing metal is built up to the desired dimension preferably by electroslag deposition in the continuous casting process. The electroslag layer bonds to the backing layer without penetrating to the inner layer, and thus preserves the corrosion resistance of the lining. Heavy tube sheets are prepared in similar manner by depositing additional backing metal behind a clad metal plate. We also have the possibility of using the side of the original clad sheet which is mild or low alloy wrought steel to make a mold or part of a mold against which the electroslag weld deposit is formed, such as by standing up the wrought clad sheets with the corrosion resisting layer outward and the wrought mild or low alloy steel layer facing inward to bond with the electroslag weld layer.

4 Claims, 19 Drawing Figures

PATENTED MAY 27 1975

3,885,922

SHEET 1

PRIOR ART

3,885,922

PRESSURE VESSEL AND BIMETALLIC COMPONENTS

DISCLOSURE OF INVENTION

This application is a continuation-in-part of application Ser. No. 237,021, filed Mar. 22, 1972 and now abandoned for PRESSURE VESSEL. That application was a division of copending application Ser. No. 74,974, filed Sept. 24, 1970 for PRESSURE VESSEL AND METHOD OF MAKING, now U.S. Pat. No. 3,696,228, issued Oct. 3, 1972.

The present invention relates to a heavy-walled pressure vessel, including tube sheets, with corrosion resistant lining or surface on one or both sides, and alloy clad steel components, such as plate, cylinders or tubes.

Heretofore it has been common to prepare such vessels by a number of different, well known practices based on the final application of a corrosion resistant surface to the otherwise completed structure. The most common method used for extra heavy pressure vessels and pipe sections is to take heavy plate, roll the plate sections, butt weld them together and then overlay the surface with corrosion resistant metal after suitable shot blasting or sand blasting to clean the surface. In the case of tube sheets a heavy plate is used as the structural metal and the clad corrosion resisting surface is applied by overlay welding. The heavy base plate may be of any number of different alloy types such as mild carbon, medium carbon or high carbon steel, low alloy steel or medium alloy steel. The weld overlay may be of any one of the commonly used AISI 300 or 400 series stainless steels, nickel, or nickel base alloy, copper or copper alloys, or special high alloy steels which are weldable onto a medium carbon, low alloy or medium alloy steel.

Many problems result from forming heavy plate section due to high pressure of rolls required, or heavy forming or forging equipment needed. Frequently heavy plate is limited because of mill practice of rolling from a large ingot. Also, problems result from applying weld overlays to heavy plate material, such as poor weld tie-ins, poor bonding to the base metal, irregular surfaces, deep penetration causing heavy dilutions of the weld within the base plate and therefore improper corrosion resistant composition.

Difficulty is also encountered in non-destructive testing of weld overlays due to irregular surfaces. Frequently an extra weld layer is required to overcome previous weld defects, which greatly adds to the cost. In many cases weld metal of the correct composition to overcome dilutions is not available and a compromise is accepted in the finished overlay.

Lower cost methods of providing clad steels (corrosion resistant material bonded to the base material for added strength) are widely known and well used in industry whenever the overall thickness of the base metal and clad material is limited. These commercial methods produce at low cost and high production rates reliable clad bimetallic plates, and are well known as rolled clad, but they are limited in thickness due to the difficulty of obtaining good bonding on heavy plates. These commercial clad plates are then fabricated into pipe sections, pressure vessels and the like whenever a corrosion resistant surface is desired.

Various attempts have been made to apply metal developed by electric arc as a means of producing clad metal. Hopkins U.S. Pat. No. 2,191,474 uses a source of molten metal which is poured into the mold synchronized with the melting of base metal by submerged arc beads. It is not practical to pour molten metal so slowly that it would keep pace with the arc melting step.

Hopkins U.S. Pat. No. 2,191,475 adds additional molten metal either by a source of molten metal from which material is poured in or by fusing an electrode. The intention is to make the carbon steel mold 12 the outside surface of the ingot requiring additional metal working operations, rather than a finished pressure vessel.

Hopkins U.S. Pat. No. 2,191,481 supplies molten metal from a source of molten metal or from melting of an electrode. The composite body produced may be used as such.

Electroslag welding and continuous casting of billets by the electroslag process is a well known technique. To some extent the electroslag process of continuous casting has been used to overlay a base material. In such cases, however, the problem of control of penetration, and hence integrity of the bond and composition of the alloy cladding, is enormous and has not been adequately solved.

Paton, Electroslag Welding, page 135, applies hard facing on a rod by electroslag welding, but does not apply a strengthening layer to a backing layer already bonded around a corrosion resisting layer.

The present invention relates to heavy-walled pressure vessels and components thereof including tube sheets with corrosion resistant liners and surfaces by combining the low cost, limited thickness, high-integrity rolled clad, or similar materials and the excellent quality electroslag welding process to create a finished bimetallic process of any thickness or shape. The invention proposes that commercial clad steel first be rolled to the proper shape and dimensions, after which a typical butt weld is used to joint the sections. An electroslag overlay is then applied to the outer surface, the overlay to be of the base metal composition of the clad metal or in some cases of different composition to give greater strength, provided the two base materials are compatible when joined by electroslag welding. The invention also proposes that commercial clad plate be overlaid on the structural side by the electroslag process to give additional thickness and strength for the production of heavy section tube sheets.

The increment of weld metal deposited at a given position of the dams, whether it be mild steel, some other plain carbon steel or alloy steel, has a decided metallurgical advantage over Hopkins U.S. Pat. No. 2,191,481, which casts a gross deposit the full width of the plate on the base metal and thus obtains coarsely dendritic cast structure in the weld. By using small increments which avoid over-heating the base metal and control the solidification of the weld metal, most of the base metal is kept cool, reducing the penetration into the base metal and dilution of the added metal.

Of course, in making a very large pressure vessel the increments of metal may be larger, but in one embodiment, they will be small compared to the size of the pressure vessel. The thickness of the increment will often be the total thickness of the buildup of structural metal on the back of wrought clad metal, although of course it can build up the structural metal in one, two or three different passes. The horizontal dimensions of the increment of metal deposited at any one time, namely the thickness perpendicular to the vessel wall and the width of bead measured longitudinally along the vessel, for best results will be limited to 4 inches by 4 inches, although satisfactory results can be obtained with horizontal dimensions of 6 inches by 12 inches or 12 inches by 6 inches, and in very large vessels the increment deposited at one time may have a dimension as much as 12 inches by 24 inches or 24 inches by 12 inches. At the other extreme, high strength low alloy steel weld metal may economically be deposited in thickness dimensions of one inch or only one-half inch, if the strength of the alloy would make such a backing equivalent to many inches of mild steel.

Equiaxed grains are formed in the solidifying weld because of the quenching action of the adjoining cool metal, and a heat treating or tempering effect is had on the previously deposited weld base adjacent to the increment being added. One size of welding shoe or dam will weld all sizes of vessel, and it is not necessary to use a special shoe for each vessel. This incremental buildup of the backing permits using thinner composite metal in making the vessel, without danger of penetration and without resorting to artificial cooling of the base metal layer, since the heat and penetration patterns will be controlled within the lower limits.

Taken all together the principle of incremental deposition makes practical the fabrication of very large corrosion and pressure resistance vessels by easy stages within the capability of a small capacity weld shop.

The invention is applicable to any bimetallic material wherein an increase in the base metal thickness is desirable beyond that commercially available. The clad metal may be roll-clad, explosion-clad, vacuum brazed or otherwise mill clad. Electroslag welding or casting can be used to produce unlimited thickness of high quality metal and this provides the means of producing unlimited thickness of bimetallic materials in a variety of shapes and forms.

In one embodiment of the present invention the clad wrought plates are stood up vertically or substantially so with the corrosion resisting layer outward and the mild steel layer or low alloy steel layer inward and electroslag welding is conducted against this latter layer, so that a superior bond will result.

Thus the superior ductility of electroslag steel as disclosed in the literature, the fracture toughness of electroslag steel, the superior fatique life of such steel and the uniformity in all directions both of chemical analysis and also physical properties are taken advantage of. At the same time the difficulty in bonding to the corrosion resisting layer is avoided because it is not necessary to bond to such layer. The electroslag deposited metal, being compositionally similar to the backing layer of the wrought clad plate, can penetrate by fusion more or less into the backing layer without materially affecting the desired composition of the electroslag layer.

It is one purpose of the invention to apply electroslag welding to build up the thickness of the structural backing metal in a completed pressure vessel or tube sheet.

It is another purpose of the invention to provide heavy-walled pressure vessels with corrosion resistant linings firmly bonded to the structural backing material.

It is a further purpose of the invention to modify commercial mill-clad material by electroslag overlaying to add any desired additional thickness to the structural backing material.

A further purpose is to provide a structural backing in any desired alloy composition to meet the design criteria.

A further purpose is to cool the corrosion resisting layer as by a water spray during welding, suitably electroslag welding, to its structural backing layer, whereby a third layer is applied thereto for strengthening, thus avoiding sensitizing the corrosion resisting layer from overheating or making it metallurgically unstable.

A further purpose is to back up a clad metal pressure vessel having the corrosion resisting layer on the inside by a third strengthening layer which is applied by welding with a strip electrode and a backing strip, welding with multiple wires welding under submerged arc process or Migwelding, the final strengthening layer being of alloy steel which is much stronger than the backing layer of the original clad metal.

A further purpose is to use the surface of a clad metal plate which is of mild or low alloy wrought steel to form the bonding layer with the electroslag steel and either totally or to that extent to avoid the necessity of employing a mold since water cooling may be used on the wrought plate.

In the drawings we have chosen to illustrate several of the embodiments in which our invention appears, selecting the forms shown from the standpoints of convenience in illustration, satisfactory operation and clear demonstration of the principles involved.

FIGS. 1 and 2 show typical plates ready to be millformed into cylindrical vessels, by methods known in the prior art. The less expensive material is indicated at 20, and the expensive corrosion resistant layer is indicated at 21.

Figure 1:
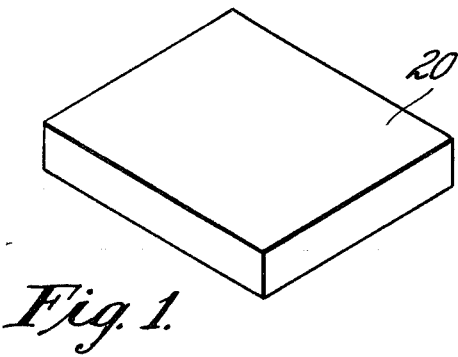
FIG. 1 is a perspective view of a typical heavy plate section ready for either forming into a vessel or heavy pipe section or for weld overlay to form a tube sheet.
Figure 2:
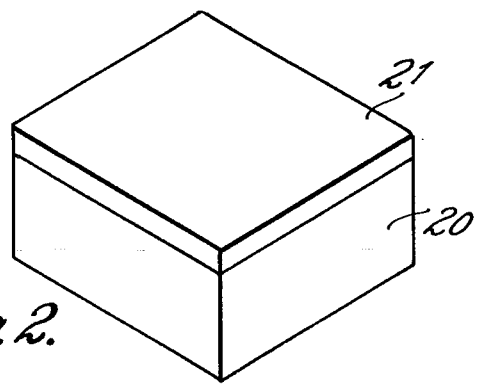
FIG. 2 is a perspective view of a typical commercial clad steel which can be used for fabricating a variety of items such as pressure vessels, pipe sections, or tube sheets. Such commercial clad plate is limited in thickness by the problem of mill rolling heavy sections.

FIG. 2 may also represent a block of steel intended to serve as a tube sheet in a condenser or heat exhanger, which lacks the desired thickness of the backing material 20 but is of adequate thickness of rollbonded cladding 21.

Figure 3:
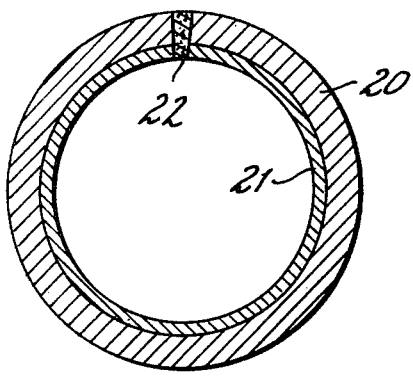
FIG. 3 is a transverse section through a typical pressure vessel, prepared by rolling clad plate into a cylinder and butt welding it, using commercial mill clad material.

FIG. 3 shows a pressure vessel in schematic section, when partially completed, the longitudinal seam 22 having been joined by butt welding, by procedures known in the art. Circumferential seams (not shown) are used to join the cylindrical portions of the vessel to dished or hemispherical heads, as required.

Figure 4:
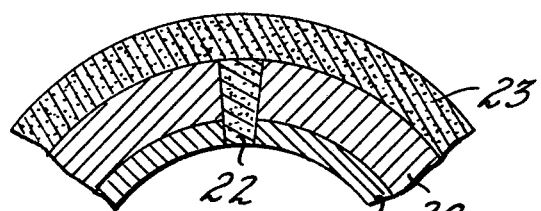
FIG. 4 is a section through the same vessel shown in FIG. 3, which has had applied to the outer surface an electroslag overlay to increase the wall thickness. The added thickness is limited only by the size of the retaining dams used to apply the overlay.

FIG. 4 shows the vessel of FIG. 3 after having been increased in wall thickness through application of the present invention through the addition of an additional layer 23 of overlay metal deposited by electroslag welding.

Figure 5:
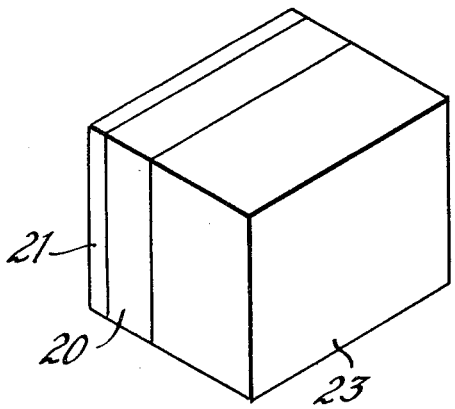
FIG. 5 is a perspective view of a slab of a typical commercial clad steel sheet, to which has been added by electroslag overlay, additional base metal thickness.

FIG. 5 shows the tube sheet of FIG. 2 when built up with additional backing 23 by electroslag overlay welding.

Figure 6:
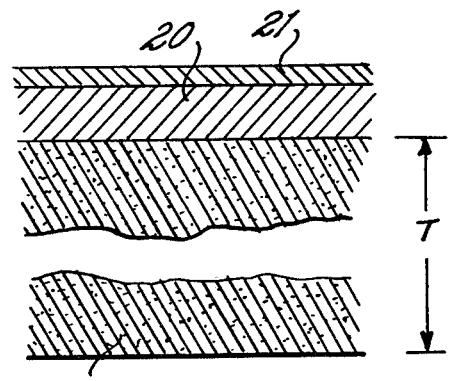
FIG. 6 is a cross section through a heavy section of bimetallic material showing commercial mill clad material overlaid by use of the electroslag process to add any desired thickness to the commercial mill clad material.

FIG. 6 is a cross section through the block shown in FIG. 5. The thickness T of the weld buildup 23 may be extended to any desired thickness.

Figure 7:
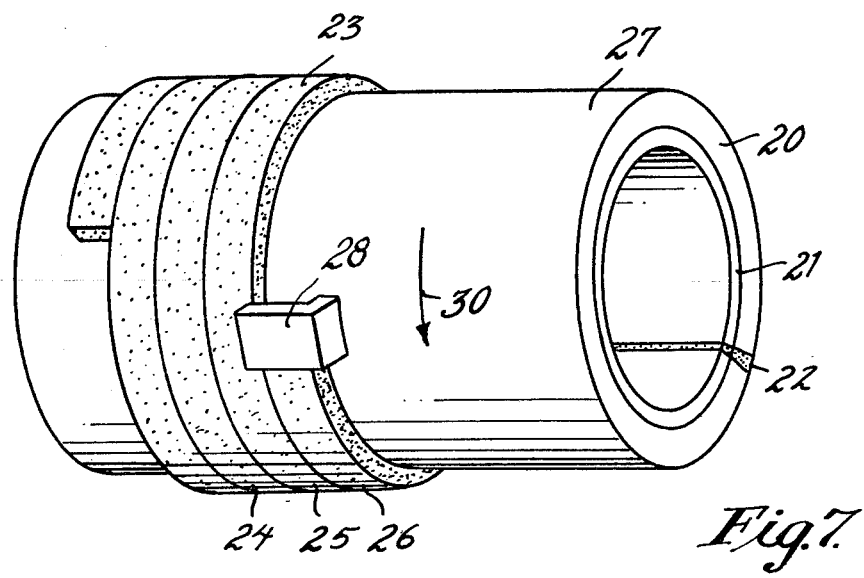
FIG. 7 is a diagram sketch, in perspective, showing one procedure that can be used to weld overlay by electroslag welding on a continuous basis a heavy-walled pressure vessel or pipe section.

FIG. 7 shows the preferred method of applying the invention. Here successive increments of overlay metal 24, 25 and 26 have been applied in spiral fashion while rotating the cylindrical shell 27 past an electroslag welding dam 28 with which (not shown) the molten slag and metal pool of the electroslag process is confined. The direction is shown by the arrow 30.

Figure 8:
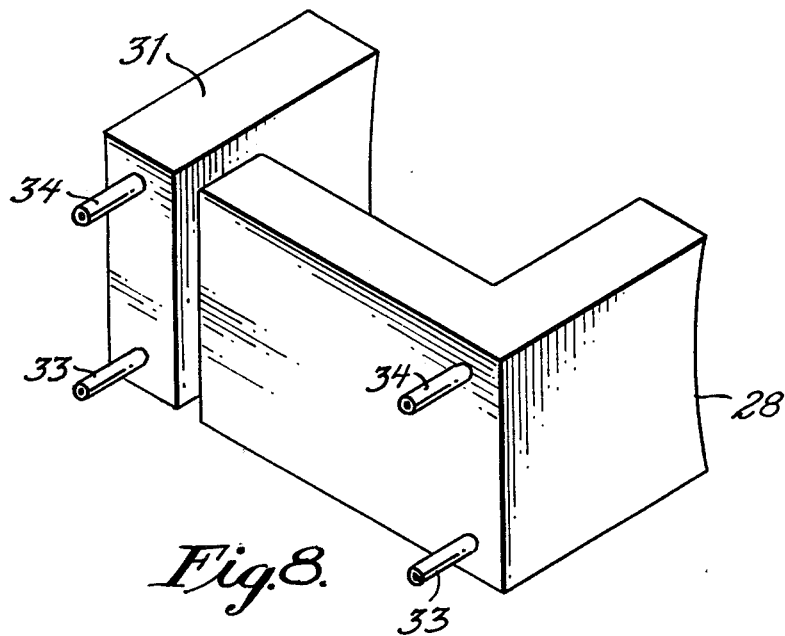
FIG. 8 is a perspective view of a two-piece dam used to make the initial overlay base.
Figure 9:
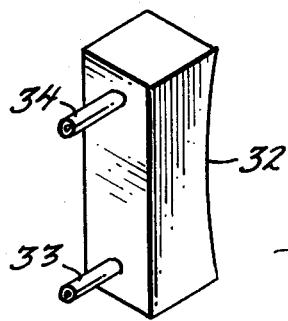
FIG. 9 is a perspective view of a replacement part which is used in the dam of FIG. 8 during the later stages of operation.

FIG. 8 shows one method of constructing the channel-shaped dam 28 and 31, which permits transforming it into an L-shaped dam 28 during overlay welding. An extension 32 of the L-shaped mold which may replace the channel wall 31 as shown in FIG. 9. Inlets are shown at 33 and outlets are provided at 34 for circulating of cooling fluid through the separate parts of the dam.

FIGS. 10, 11, 12 and 13 illustrate the sequence of operations leading up to the continuous welding process of FIG. 7. At the start of welding the channel-shaped mold of FIG. 8 is assembled using parts 28 and 31. These are water cooled blocks of copper, with inlet ports 33 and outlet ports 34, but they can be cooled by any other convenient means. Mold part 31 is held in sliding contact with the edge of mold part 28, as by clamps or by a mortised keyway (not shown).

Figure 10:
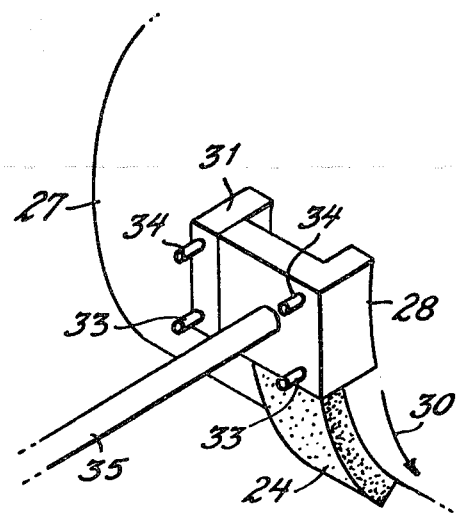
FIG. 10 is a perspective view of the dam in position during the welding of the first base.

As shown in FIG. 10, rotation of the cylinder 27 in the direction of the arrow 30, with the dam held stationary by means of an arm 35 from an external support (not shown), and deposition of electroslag weld metal within the mold 28, 31 deposits a layer of metal 24 on the surface of the shell 27.

Figure 11:
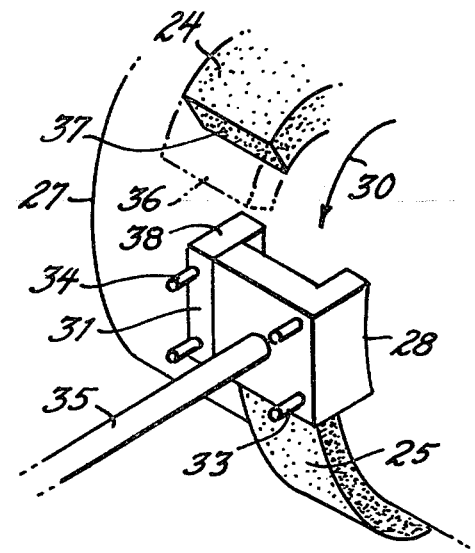
FIG. 11 is a view similar to FIG. 10 showing the dam approaching the tie-in with the start of welding.

As shown in FIG. 11, this deposition is preferably planned to follow a spiral path which will intersect the starting point adjacent one edge of bead 24. In anticipation of this tie-in, a starting stool 36 is removed by flame cutting or by other means, leaving the end face 37 of bead 24 in condition to nest snuggly under the upper face 38 of dam 31 when it reaches the position formerly occupied by the stool. Since the deposit 24 is now about to begin the second course around the vessel, it has been numbered 25.

Figure 12:
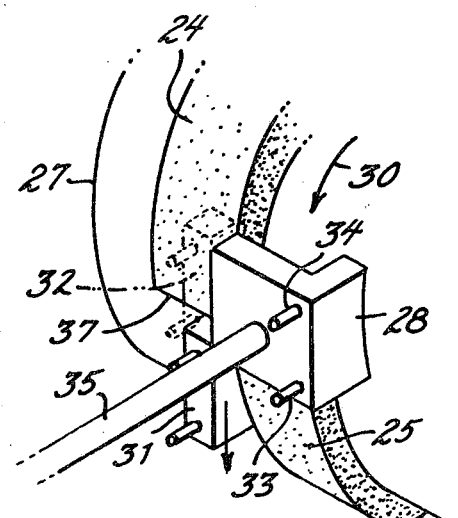
FIG. 12 is a perspective view of the dam during the tie-in operation in which the dam part of FIG. 9 is used.

FIG. 12 shows the start of the overlapping tie-in operation. Dam 31 is not rotated in contact with shell 27 being nudged along by the prepared end 37 of bead 24, and thus is sliding downward past dam 28. Dam 32 is in process of replacing dam 31 so as to extend the contact of dam 28 with the upper surface of bead 24 and so prevent runout of the molten metal.

Figure 13:
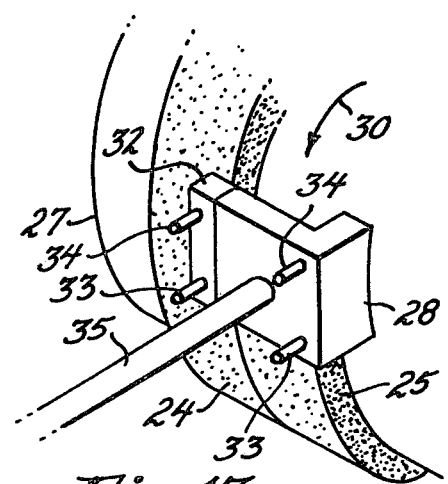
FIG. 13 is a perspective view of an L-shaped dam as it continues to mold a spiral overlay weld deposit.

FIG. 13 shows the continuous operation after the starting point has been successfully passed. Bead 25 is, of course, merely the spiral continuation of bead 24.

Figure 14:
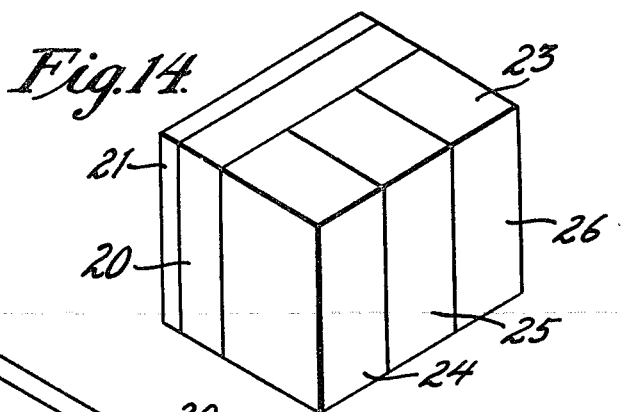
FIG. 14 is a perspective view of a flat plate similar to FIG. 5, showing the electroslag reinforcement which has been applied in successive passes.

FIG. 14 shows a flat plate of clad steel, with an alloy layer 21 and a backing layer 20, built up with structural layer 23 composed of separate weld additions 24, 25 and 26.

Figure 15:
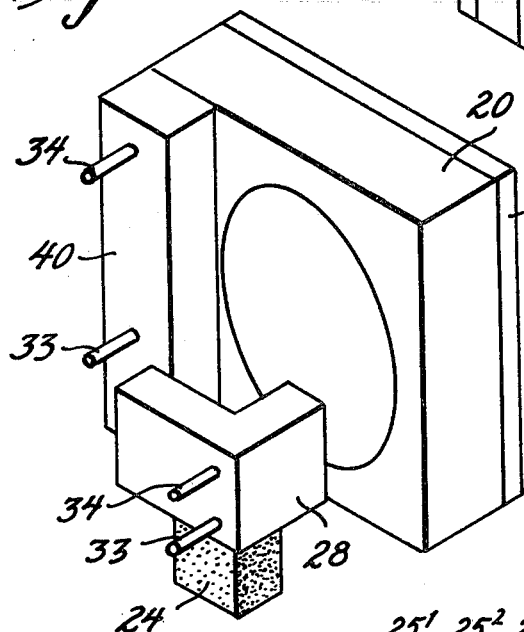
FIG. 15 is a perspective view of a tube sheet being overlaid with a structural layer, using a phased starting dam and an L-shaped movable dam.

FIG. 15 shows one method of preparing the plate of FIG. 14, using an artificial first bead 40 against which to deposit the initial weld bead 24. The artificial bead is a bar of copper water cooled through an inlet tube 33 and an outlet tube 34. The L-shaped dam thus may be used for the entire overlay operation, as it overlaps starting shoe 40 during deposition of bead 24 just as it will later overlap bead 24 to deposit a second bead, and so on.

Figure 16:
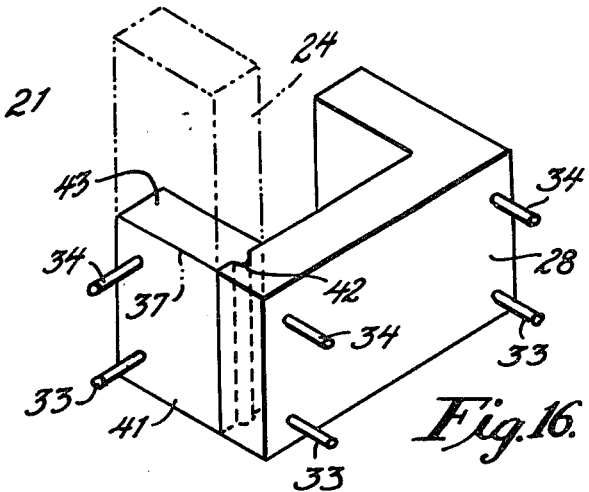
FIG. 16 is a perspective view of a special dam with removable side.

FIG. 16 shows an alternate construction of a channel-shaped dam similar to dam 28 and 31 of FIG. 8, in which the movable side 41 of the dam is slidably held in position against dam 28 by keyway 42. When the upper face 43 of dam 41 comes in contact with the prepared end 37 of bead 24, FIG. 11, rotation of the shell downward relative to shoe 28 will force dam 41 downward as guided by the keyway 42 until it finally loses contact with shoe 28 and may be disconnected from the equipment.

Figure 17:
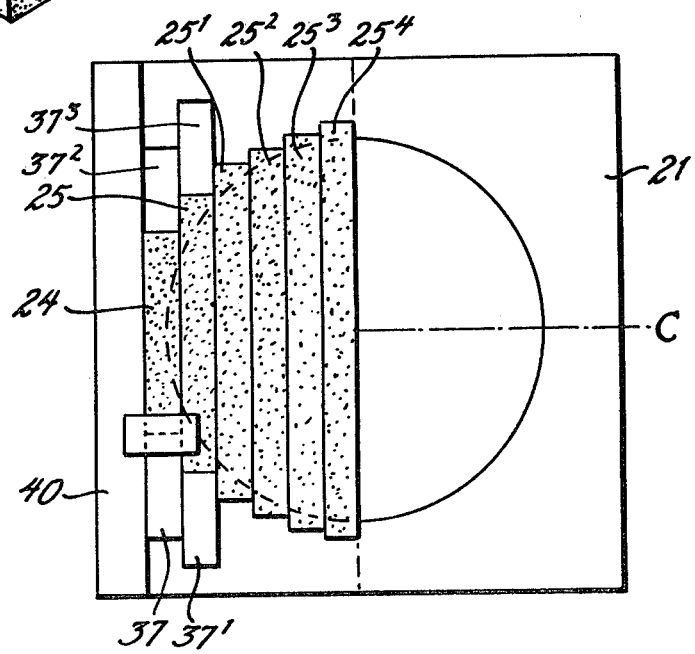
FIG. 17 is a plan view of the placement of weld beads on a prospective tube sheet from which a 4 foot diameter disc will later be machined.

FIG. 17 shows the method of depositing successive beads 24, 25, 25', $25^2$, $25^3$ and $25^4$ on half of a plate which will later be converted into a tube sheet. A water-cooled copper shoe 40 is clamped alongside the location of the front bead 24, and a water-cooled stool 37 is clamped next to shoe 40 as shown, some 15 inches below the center line C in a typical installation. After deposition of bead 24, a second stool 37' is clamped next to stool 37 at a position typically 18 inches below the center line. After deposition of bead 25, a new stool (not shown) is clamped against stool 37' at a position at least typically 21 inches below the center line. In turn stools for the deposition of beads $25^2$, $25^3$ and $25^4$ will be clamped in place at least 24 inches below the center line. At the top of the weld beads we place a series of bars $37^2$ and $37^3$ (only two are shown) of copper or suitable material to prevent run-off in each bead when it rises beyond the proceding bead (similar to the way bars 37 and 38' operate at the bottom). In this way the surface of the backing metal 21 will be covered with weld beads 24, 25, 25', $25^2$, $25^3$, $25^4$ and their symmetrical counterparts to the right of center, of a center circular area typically 4 feet in diameter.

EXAMPLE 1

A nuclear reactor equivalent to the Shippingport reactor vessel is prepared by the present process in the following manner.

The shell for the Shippingport reactor was rolled from A302B manganese-molybdenum steel seven inches thick, and then a stainless steel overlay was applied to the inside surface by series-arc overlay extending as described in the Welding Journal, volume 36 (11), pages 1078–1084 (November 1957); the inside diameter of the shell was over nine feet, and the stainless overlay was at least three-eighths inch thick, to assure that the exposed surface was of corrosion resisting composition.

Following the procedure of the present invention a vessel of the same internal diameter and length is first formed with Lukens 10% clad plate only one inch thick, the clad layer being type 304 stainless steel with guaranteed minimum thickness of 0.10 inch which is deemed adequate for the intended service since this entire thickness is a wrought product of type 304 composition. The completed shell is then brought to an electroslag welding station where it is mounted on turning rolls broadside to the welding machine, and a water-cooled copper dam retaining shoe of channel shape configuration 6 inches deep, 8 inches wide and 7 inches high is brought to bear against the shell at the three o'clock position, thereby defining a thickness of 6 inches and width of 8 inches of metal to be built up in one pass on the surface through electroslag weld deposition. The dam has a removable wall at the left side and an L-shaped wall at the center and right sides.

A stool or plug of mild steel (layer to be cut away) is placed within the dam at the bottom to provide a starting tab. Three manganese-molybdenum alloy steel electrode wires one-eighth diameter are prepared for feeding into the welding area through the three guide tubes of the welding machine. A quantity of electroslag welding flux placed within the dam rests upon the stool. Arcs are struck to melt the flux, and more flux is added until a pool of molten slag is created of sufficient depth to submerge and extinguish the arcs by converting the method of energy transfer to electroslag conduction. The wires are positioned into the slag at a steady rate for the welding machine, maintaining a voltage drop of 46 volts at a current of 700 amperes per wire. These are average values. The voltage may vary between 40 and 60 volts without adversely affecting the process, and the current may be adjusted between 500 and 1,000 amperes per wire in normal practice. The rate of melting of the wires by the slag bath will depend on the current and the voltage chosen as they determine the bath temperature. Under the conditions quoted the electrode wires are melted off within the slag bath at a speed of approximately 170 inches per minute or 35 pounds per hour per electrode.

Commensurate with the rate of wire consumption as indicated by the rising level of the bath within the dam, the shell is rotated slowly downward past the dam to withdraw the stool and then to withdraw successive lengths of deposited overlay in the bottom of the dam, maintaining the level of the slag surface at the desired working position within the dam. During the welding of the first circumferential bead around the circumference the starting stool is removed by flame cutting.

On completing one circumference of the shell along a spiral path calculated to bring the left side of the dam in front of the right side of the starting point, the removable wall at the left side of the shoe is detached, when it comes in contact with the starting weld and deposition of metal continues within the channel-shaped pocket now being formed by the L-shaped dam and the previously deposited metal. Overlay deposition then continues until the entire surface of the shell has been covered.

The shell is now seven inches thick with 0.1 inch of stainless steel on the inside surface, comparable in strength and function to the Shippingport reactor.

EXAMPLE 2

A shell similar to Example 1 is overlaid using equipment which feeds a continuous strip electrode into the dam. The cross section in the strip electrode is 0.030 inch thick by 6 inches wide. The voltage is 46 volts as before but the current on this single electrode is 2100 amperes. The composition of the strip is manganese-molybdenum steel. During the welding deposition a spray of water is directed upon the inner surface of the vessel at the location of the dam to cool the type 304 stainless steel clad layer for greater assurance of metallurgical stability and avoidance of sensitization from overheating.

The resulting overlay is comparable to that of Example 1.

EXAMPLE 3

A trimetallic tube sheet of unusual properties is prepared as follows for use in a heat exchanger of cylindrical cross section four feet in diameter.

A plate of explosion-clad 10% type 304L clad steel 5 feet square by 2 inches thick in which the backing metal is type A302B manganese-molybdenum steel, is placed vertically with the backing face in welding position facing an electroslag welding machine equipped with a water-cooled shoe as in FIG. 15, the working depth and width of the shoe being 1 inch by 4 inches.

A water-cooled shoe 40 of FIG. 15 5 feet long is clamped vertically against the left side of the backing steel, and the water-cooled stool 37 of 1 inch by 4 inches cross section and 14 inches long is clamped hermetically against the backing of steel and in contact with the shoe 40 with its upper face at a location somewhat more than 15 inches below the center line of the proposed circular tube sheet after machining. The dam 28 is then installed against the backing and starting shoe 40 enclosing stool 37 and creating a welding pocket measuring one inch by four inches and approximately 6 inches deep.

A welding electrode strip of high purity low carbon iron of cross section 0.040 inch by 3 inches is fed downward into the pocket, centrally located with respect to the opposite faces of the rectangular cavity. A ball of steel wool is placed between the end of the strip and the stool for ease of starting an arc, and a small amount of flux is placed within the pocket, having a composition typically

| | |
|---|---|
| Calcium fluoride | 6% |
| Silica | 35% |
| Manganous oxide | 40% |
| Alumina | 5% |
| Lime | 7% |
| Titania | 3% |
| Ferrous oxide | 3% |
| Sodium oxide | 1% |

A welding current of 35 volts and 700 amperes is passed into the strip from contacts above the shoe, and a ground connection is made to the stool or to the backing metal, thus melting the steel wool and establishing the arc, which is maintained by advancing the strip downward into the pocket as it melts off. Additional flux is added until an electroslag pool has been established.

Powdered metal particles of ferromagnetic character and with an overall chemical composition sufficient to form an alloy known as 4Ni Cr Mo V HY-130/150 having a ladle composition as follows:

| | |
|---|---|
| C | 0.12% |
| Mn | 0.91% |
| Si | 0.23% |
| S | 0.004% |
| P | 0.011% |
| Cr | 0.60% |
| Ni | 5.23% |
| Mo | 0.61% |
| V | 0.06% |
| Al (acid soluble) | 0.010% |
| N | 0.011% |
| Fe | balance | when the particles and the strip electrode are simultaneously melted, are then caused to cling to the surface of the descending strip electrode in the manner of Sunnen U.S. Pat. No. 3,344,839 by the electromagnetic forces above the electrified strip. The voltage is then raised to 50 volts and the current to 1500 amperes to provide sufficient energy to maintain the slag bath at a temperature of 3000°F. while depositing a bead of 5Ni Cr Mo V HY-130/150 weld metal against the backing metal. The shoe 28 and the welding equipment are progressed upward during the deposition to contain the slag and metal pools within the water-cooled area. Deposition is terminated when the crater of bead 24 is assuredly at least 15 inches above the center line of the deposited overlay.

Keeping stool 37 in position, a second stool 37' of comparable dimensions (it may be shorter, say 10 inches long) is located adjacent stool 37 with its upper face at least 18 inches below the overlay center line, and the welding equipment is repositioned to enclose stool 37'. An extension of bead 24 is provided at the top as shown in FIG. 17. The welding sequence is repeated, depositing the second bead 25 of 5Ni Cr Mo V HY-130/150 metal which melts into the side of bead 24, and the backing 20 and which is terminated at least 18 inches above the center.

Similarly, bead 25' is deposited against bead 25, extending at least 21 inches below to 21 inches above the center. Similarly, beads $25^2$, $25^3$ and $25^4$ are deposited extending at least 2 feet below to 2 feet above the center.

Six additional beads are finally deposited, diminishing progressively in length symmetrically to the first six beads. The surface of the backing material 20 is now overlaid with a composite block of weld beads over 2 inches thick, from which a tube sheet 4 feet in diameter can readily be machined.

The resulting tube sheet has a corrosion resistant surface 21 comprising type 304L stainless steel at least 0.200 inches thick, roll bonded to A302B backing metal of variable thickness because of the welding penetration, which in turn is bonded to a layer of 5Ni Cr Mo V HY-130/150 steel at least 2 inches thick. The strength properties of the 5 Ni Cr Mo V HY-130/150 layer make this trimetallic tube sheet (only 4 inches thick) equivalent to a bimetallic A302B clad sheet some 10 inches thick, which is a great saving in weight and material.

EXAMPLE 4

A pressure vessel is made by welding together a corrosion resisting steel layer, suitably type 304L stainless steel, and a backing layer of plain carbon steel. This backing layer is backed up by backing with a high strength alloy steel. In one variation of this example the alloy steel strengthening layer is applied using a strip electrode, and also laying down on the work a backing strip. Other techniques for applying the strengthening layer are multiple wire submerged arc welding and Migwelding. This creates a three-layer vessel having the high strength alloy steel on the outside. Because the alloy steel is high strength, a deposition of for example one-half inch will take the place of a strengthening layer of 2½ inches of mild steel.

While one means of providing a starting course has been described, it will be evident to those familiar with the electroslag welding overlay techniques that other starting methods may be used, for example, a suitably thick ring of copper may be provided with water cooling and split up so that the ring overlaps after one complete revolution around the surface of the vessel. This ring may be tied in place by turnbuckles or other suitable device, and such a ring can thus provide a starting surface against which an L-shape mold rides and encloses the first pass of deposited overlay weld metal. By such a method the mold wall 31 and the mold extension 32 can be eliminated.

By the use of this invention, materials engineers and designers have a new process to select alloys for the service application of the vessel. By the electroslag overlay method described they can add such alloys at only a slight added cost over that of ordinary steel. For example, the starting clad metal to be overlaid may well be a standard roll clad plate or cylinder with stainless steel on a carbon steel back. The strength and toughness qualifications may indicate that an alloy steel overlay will be more desirable than ordinary carbon steel and may in fact permit the use of lesser thickness with economies in fabrication, in designs of supporting structures and possibly of operation of the vessel. A vessel for use at low temperature can be thus produced with an alloy steel having up to 10% nickel for toughness at the desired temperatures. A vessel for high temperature operation can be constructed with a steel containing chromium and/or molybdenum. Alloys which permit steels of up to 200,000 pounds per square inch tensile strength are well known and can be readily deposited by the electroslag process, permitting designs with lesser wall thickness than those made entirely of ordinary carbon steel.

In the example described, the metal providing the overlay is illustrated as one-eighth inch diameter wire. It is well known in Parsons U.S. Pat. Nos. 3,507,968 and 3,511,303 that electroslag melting produces high quality steel and other alloys when the electrodes are inexpensive carbon steel wires or strips and alloys are introduced as powder. The present invention combined with this known method of producing alloy steels offers an economical method of producing pressure vessels for a wide variety of applications.

EXAMPLE 5

Figure 18:
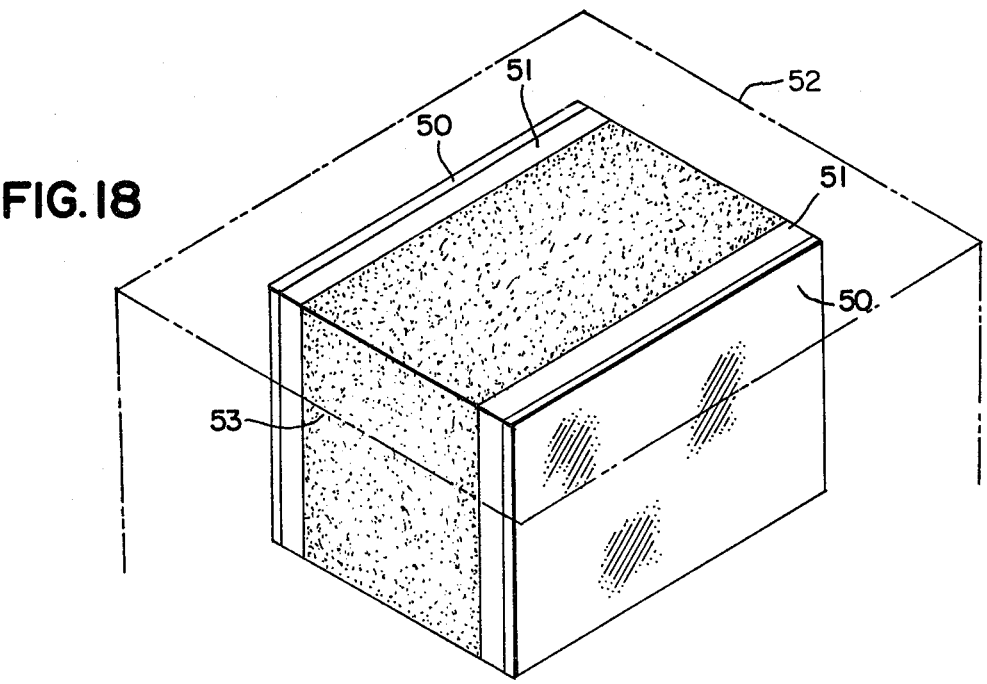
FIG. 18 is a schematic view showing two clad metal plates standing up on opposite sides of the space in which electroslag welding is beind conducted.

FIG. 18 shows two clad plates produced by rolling and each consisting of a layer of stainless steel 50 clad to a layer of mild steel or low alloy steel 51 in which the plates are upright and parallel and facing toward one another with the mild steel or low alloy steel layers inward. A water cooled mold 52 is surrounding all of them and against the corrosion resisting layer. Thus the wrought clad plates are in effect functioning as part of the mold interior.

The electroslag layer 53 is deposited between them and bonds to the wrought mild or low alloy steel layers 51. Thus a double faced plate is produced which has the advantage of high integrity of the wrought clad bonds between stainless layers 50 and the mild or low alloy steel layers 51 and uniform thickness of the stainless layers 50 and also has the advantage of the superior ductility, fracture toughness, fatigue life and chemical and physical uniformity of the layer 53.

EXAMPLE 6

Figure 19:
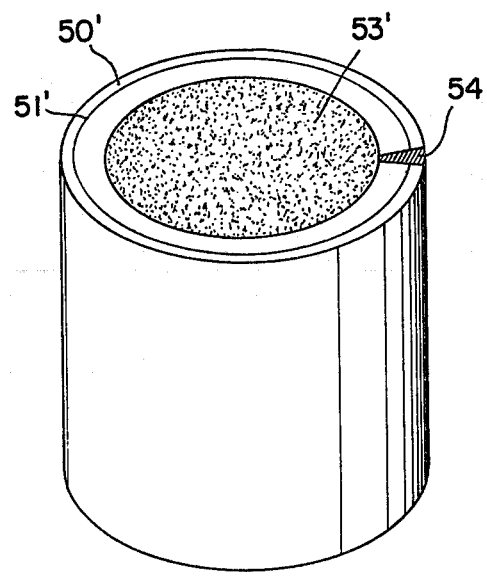
FIG. 19 shows a conventional rolled or explosion clad cylinder with the corrosion resisting layer on the outside, and the electroslag layer on the inside.

FIG. 19 shows a cylindrical shell of roll or explosion clad metal having a corrosion resisting layer 50' on the outside and a mild or low alloy steel layer 51' on the inside mounted on a suitable stool. Instead of a mold the outside of the corrosion resisting layer receives continuous spray cooling or the cylinder is put in a water cooled mold. The electroslag layer 53' is deposited on the inside. The original cylinder is completed by a weld 54 which of course precedes the formation of the inner electroslag layer.

In these last two examples, Examples 5 and 6, it will be evident that the corrosion resisting layer may be of any composition suggested for such a layer and the wrought layer 51 or 51' and the electroslag deposit 53 may be of any one of the compositions suggested for such layers.

The methods for overlaying clad plates and cylindrical vessels can equally well be adapted for the production of hemispherical heads, dished heads, and other surfaces, using the spiral overlay techniques or other known methods of applying heavy overlay deposits.

The electroslag method of overlaying is particularly suitable for carrying out this invention because of its continuous nature, its high quality metal and its economy. Other overlay methods, such as submerged arc, plasma arc, metal arc inert gas, and tungsten are inert gas processes may be found applicable in certain cases for carrying out the invention.

In summary it is evident that the corrosion resistant layer may be AISI 300 series stainless steel, AISI 400 series stainless steel, nickel or nickel alloy, Monel, Inconel, Incoloy, Copper Development Classification Alloys, aluminum, aluminum alloy, titanium, titanium alloy, zirconium, zirconium alloy, a refractory metal such as tungsten, a noble metal such as platinum or gold, or a cobalt base alloy. The structural backing layer is mild carbon steel, medium carbon steel, high carbon steel, low alloy steel, or medium alloy steel in most cases. The weld deposited layer which is applied by electroslag welding may be mild carbon steel weld metal, high carbon steel weld metal, low alloy steel weld metal or medium alloy steel weld metal.

An especially important feature of the present invention is that with the ultimate structure of the present invention, there is a bimetallic portion having the excellent bonding characteristics of bimetallic structures produced by wrought forming, so that what may be quite dissimilar metals bonded intimately, and on the side away from the corrosion resistant layer of this bimetallic structure, there is a structural layer which may be of great thickness and strength which has not in any way pentrated in a manner to disturb in the slightest the complete integrity of the corrosion resistant layer forming the far part of the bimetallic portion of the structure first mentioned. More specifically, the bimetallic portion of the structure already first mentioned as having the special characteristics of a wrought structure will after the structure is entirely complete have an unimpaired uniformity of thickness of the corrosion resistant layer in its original undiluted state which will insure that the entire corrosion resistant layer has that thickness and gets that protection yet with an absolute minimum of necessity as a result of the particular results used in producing the overall structure of any excess of thickness at particular places. It will be understood that where a certain particular minimum of thickness is required for a particular application, that any excess of thickness in particular areas which is not found in other areas would be sheer waste, adding to the expense of the device without any substantial increase in the protective quality. The present invention secures this uniformity in the final product, whereas if we attempted to do the same thing by other methods, this would not be secured. This inherently is in addition to the other advantages mentioned earlier and is a specific feature of the final product which would not be found in final products which might be conceived of not involving this particular method of manufacture. As already indicated, there are also other additional advantages of the present structure, such as its possession of various special properties characteristic of electroslag deposition which are especially pertinent to the particular structure involved and the features of the particular layer involved from the structural standpoint.

In view of our invention and disclosure, variations and modifications to meet individual whim or particular need will doubtless become evident to others skilled in the art to obtain all or part of the benefits of our invention without copying the product shown, and we, therefore, claim all such insofar as they fall within the reasonable spirit and scope of our claims.

Having thus described our invention what we claim as new and desire to secure by Letters Patent is:

1. A heavy-walled multi-layer metallic vessel comprised of a corrosion resisting surface layer, a structural layer bonded thereto, and a plurality of increments of weld deposited layer bonded to the structural layer, in which said corrosion resisting layer is of an alloy or metal selected from the class consisting of AISI 300 series, AISI 400 series, nickel, nickel alloys, Copper Development Classification Alloys, aluminum, aluminum alloy, titanium, titanium alloy, zirconium, zirconium alloy, a refractory metal, a noble metal and a cobalt base alloy; the said structural layer is from a steel selected from the class consisting of mild carbon steels, medium carbon steels, high carbon steels, low alloy steels and medium alloy steels; and said weld deposited layer is selected from the class consisting of mild carbon steel weld metal, high carbon steel weld metal, low alloy steel weld metal and medium alloy steel weld metal, the weld deposited layer having the dendritic grain structure and metallurgical properties characteristic of electroslag deposited metal.

2. A heavy-walled metallic vessel comprising a bimetallic wrought clad plate, one side of which is a corrosion-resisting layer of the class consisting of stainless steel of the AISI 300 or 400 type, and an alloy rich in nickel, copper, aluminum, titanium or zirconium, the other side of which is a layer of the class consisting of mild carbon steel, medium carbon steel and low alloy steel, and having the homogeneity characteristic of wrought bimetallic materials, to which said other side only has been applied by electroslag deposition a layer of the class consisting of mild carbon steel, medium carbon steel, low alloy steel and medium alloy steel, having the dendritic grain structure and metallurgical properties characteristic of electroslag deposited metal.

3. A heavy-walled metallic vessel comprising two bimetallic wrought clad plates, on each of the plates the outside surface comprising a corrosion resisting layer of the class consisting of stainless steel of AISI 300 or 400 type and an alloy rich in nickel, copper, aluminum or zirconium, the other side of the bimetallic plates being a layer of the class consisting of mild carbon steel, medium carbon steel or low alloy steel, and having the improved bonding characteristic of wrought metal bonding, between which layers of mild carbon steel, medium carbon steel, or low alloy steel of the respective bimetallic wrought clad plates an electroslag layer is deposited of the class consisting of mild carbon steel, medium carbon steel, low alloy steel and medium alloy steel, simultaneously fusing the inside surfaces of the wrought clad plates to form a plate uniformly clad on both sides, the electroslag layer having the dendritic grain structure and metallurgical properties characteristic of electroslag deposited metal.

4. A clad member of metallic composition comprising a bimetallic wrought clad plate formed into a cylinder, the outside surface of which bent in cylindrical form, the outside surface of which is a corrosion resisting layer of the class consisting of stainless steel of the AISI 300 or 400 type, and an alloy rich in nickel, copper, aluminum, titanium, or zirconium and the inside surface of which is a layer of the class consisting of mild carbon steel, medium carbon steel and low alloy steel, the bond between the two said layers being that characteristic of wrought metal bonding, and on the exposed inner surface of the mild carbon steel, medium carbon steel or low alloy steel layer an electroslag deposited layer of the class consisting of mild carbon steel, medium carbon steel, low alloy steel and medium alloy steel is fused to the layer of mild carbon steel, medium carbon steel, low alloy steel, or medium alloy steel, the electroslag layer having the dendritic structure and metallurgical properties characteristic of electroslag deposited metal.

* * * * *